United States Patent
Ma et al.

(10) Patent No.: US 8,756,298 B2
(45) Date of Patent: Jun. 17, 2014

(54) SYSTEM FOR AUTOMATIC CONFIGURATION OF COMPUTERS IN A SERVER FARM

(75) Inventors: Kevin Ma, Nashua, NH (US); Kevin McAdams, Groton, MA (US)

(73) Assignee: Cisco Technology, Inc., San Jose, CA (US)

( * ) Notice: Subject to any disclaimer, the term of this patent is extended or adjusted under 35 U.S.C. 154(b) by 744 days.

(21) Appl. No.: 11/316,504

(22) Filed: Dec. 21, 2005

(65) Prior Publication Data

US 2007/0143454 A1 Jun. 21, 2007

(51) Int. Cl.
*G06F 15/177* (2006.01)

(52) U.S. Cl.
USPC ........... 709/221; 709/203; 709/208; 709/220; 709/245

(58) Field of Classification Search
USPC ......... 709/203, 217, 220, 221, 222, 223, 224, 709/208
See application file for complete search history.

(56) References Cited

U.S. PATENT DOCUMENTS

| | | | |
|---|---|---|---|
| 5,136,708 A * | 8/1992 | Lapourtre et al. ............ | 718/103 |
| 6,757,723 B1 | 6/2004 | O'Toole et al. | |
| 6,859,929 B1 * | 2/2005 | Smorodinsky ................ | 719/310 |
| 6,920,506 B2 | 7/2005 | Barnard et al. | |
| 6,934,754 B2 | 8/2005 | West et al. | |
| 6,941,356 B2 | 9/2005 | Meyerson | |
| 6,944,653 B2 | 9/2005 | Fong et al. | |
| 7,039,688 B2 * | 5/2006 | Matsuda et al. ............. | 709/220 |
| 7,051,087 B1 * | 5/2006 | Bahl et al. .................... | 709/220 |
| 7,089,297 B1 * | 8/2006 | Salas et al. ................... | 709/220 |
| 7,213,065 B2 * | 5/2007 | Watt ............................. | 709/223 |
| 7,328,237 B1 * | 2/2008 | Thubert et al. ............... | 709/203 |
| 7,389,510 B2 * | 6/2008 | Forrester ..................... | 718/105 |
| 7,406,692 B2 * | 7/2008 | Halpern et al. .............. | 718/105 |
| 7,509,369 B1 * | 3/2009 | Tormasov .................... | 709/201 |
| 7,577,723 B2 * | 8/2009 | Matsuda et al. ............. | 709/220 |
| 7,684,406 B2 * | 3/2010 | Hahn ......................... | 370/395.2 |
| 7,756,972 B2 * | 7/2010 | Ma ............................... | 709/224 |
| 2002/0087707 A1 * | 7/2002 | Stewart et al. .............. | 709/230 |
| 2002/0116479 A1 * | 8/2002 | Ishida et al. ................. | 709/220 |
| 2003/0115298 A1 * | 6/2003 | Baker .......................... | 709/220 |
| 2004/0268358 A1 * | 12/2004 | Darling et al. ............... | 718/105 |
| 2005/0235000 A1 * | 10/2005 | Keil ............................. | 707/200 |

OTHER PUBLICATIONS

"Configuration Services", Chapter 3, 28 pagers, Aquired at: http://www.cisco.com/en/US/products/hw/contnetw/ps792/products_configuration_guide_chapter09186a0080409c84.html.

(Continued)

*Primary Examiner* — Rupal Dharia
*Assistant Examiner* — Van Kim T Nguyen
(74) *Attorney, Agent, or Firm* — Fish & Richardson P.C.

(57) ABSTRACT

A load balancer in a server farm automatically detects the addition of a server to a pool, decides on a proper configuration of the added server, and automatically configures the added server. A network configuration event such as a Dynamic Host Configuration Protocol (DHCP) event is used as the basis for detecting the addition of the server. The load balancer determines how to configure the added server according to a predetermined approach. For example, the added server can replicate a configuration of the highest priority service in an existing pool.

24 Claims, 3 Drawing Sheets

(56) References Cited

OTHER PUBLICATIONS

"Big IP, Big IP Enterprise Controller", 4 pages, Aquired at: http://www.icann.org/tlds/org/applications/register/attachments/hardware/network/Color-BigIP.pdf.

William V. Wollman, "Plug and Play Server Load Balancing and Global Server Load Balancing for Tactical Networks", The MITRE Corporation, 12 Christopher Way, Eatontown, NJ 07724, 5 pages, Aquired at: http://www.mitre.org/work/tech_papers/tech_papers_03/wollman_balancing/wollman_balancing.pdf.

"Apache HTTP Server Version 2.2, Apache Module mod_proxy_balancer", Copyright 1995-2005, The Apache Software Foundation or its licensors, as applicable, 4 pages, Aquired at: http://httpd.apache.org/docs/2.1/mod/mod_proxy_balancer.html.

\* cited by examiner

SYSTEM FOR AUTOMATIC CONFIGURATION OF COMPUTERS IN A SERVER FARM

BACKGROUND OF THE INVENTION

This invention relates in general to digital processing and more specifically to automated configuration of servers in a collection of servers such as a server farm.

Many of today's computer applications require large numbers of separate computers coupled by a network to perform large scale or large volume computing tasks. Tasks such as web page serving, database processing and accessing, transaction processing, etc., can require very large collections of processing devices, such as computers. The computers are coordinated to provide services that form a part of the overall task. These large collections of coordinated servers are referred to as server "farms." Server farms can include tens, hundreds, thousands or more separate computer systems, or servers. The servers are usually interconnected by a common network and are provided with centralized control or management.

Because of the changing demands of the tasks, servers are often added to the active server "pools." Sometimes the addition of servers is in response to an increased workload or traffic condition. For example, a web site may be more active at certain times of the day. Or a company may be growing in popularity so that a steady increase in traffic is seen over time. Servers may be removed from a pool and then added back at a later time due to maintenance, cost, or other considerations.

When a server is added to a pool, or brought "online" it is designated for a service within the pool. An added server may be configured to perform one or more different services. Examples of services include serving a web page or class of web pages, running an application or class of application; etc. A pool may be a group of physical servers, or a more logical entity such as a group of servers that perform a specific function or provide a specific service.

Usually it is necessary to configure the system (e.g., server farm) to allow an added server to perform a service. It may be necessary to configure the network to route traffic to the added server and to allow the added server to have access to network resources appropriate for the service the added server is to perform. For example, depending on the service assigned to a server, different software may need to be loaded into the server, interconnections and protocols established, or other setup, configuration and management performed on the added server or on the network and other devices within the system.

Typically, the configuration of a server involves human action. Often a new server is completely configured manually. In other approaches, a degree of automation may be provided such as allowing a human network administrator to designate that the new server be provided with a type or category of service or other group of resources. These approaches, even with partial automation, can become tedious, time consuming and error-prone especially where the server farm is large and has changing service demands. Adding a server to a pool may also require other devices, such as load balancers, to be configured or changed manually.

DETAILED DESCRIPTION OF EMBODIMENTS OF THE INVENTION

In a preferred embodiment, a load balancer in a server farm automatically detects the addition of a server to a pool, decides on a proper configuration of the added server, and automatically configures the added server. A Dynamic Host Configuration Protocol (DHCP) event is used as the basis for detecting the addition of the server. Other embodiments can use other protocols or approaches. The load balancer determines how to configure the added server according to a predetermined approach. For example, the added server can replicate a configuration of the highest priority service in an existing pool. A script is then executed to automatically configure the load balancer. Notification is sent to other devices such as switches, routers, etc., as needed to configure the added server to perform the service within the server farm.

Figure 1:
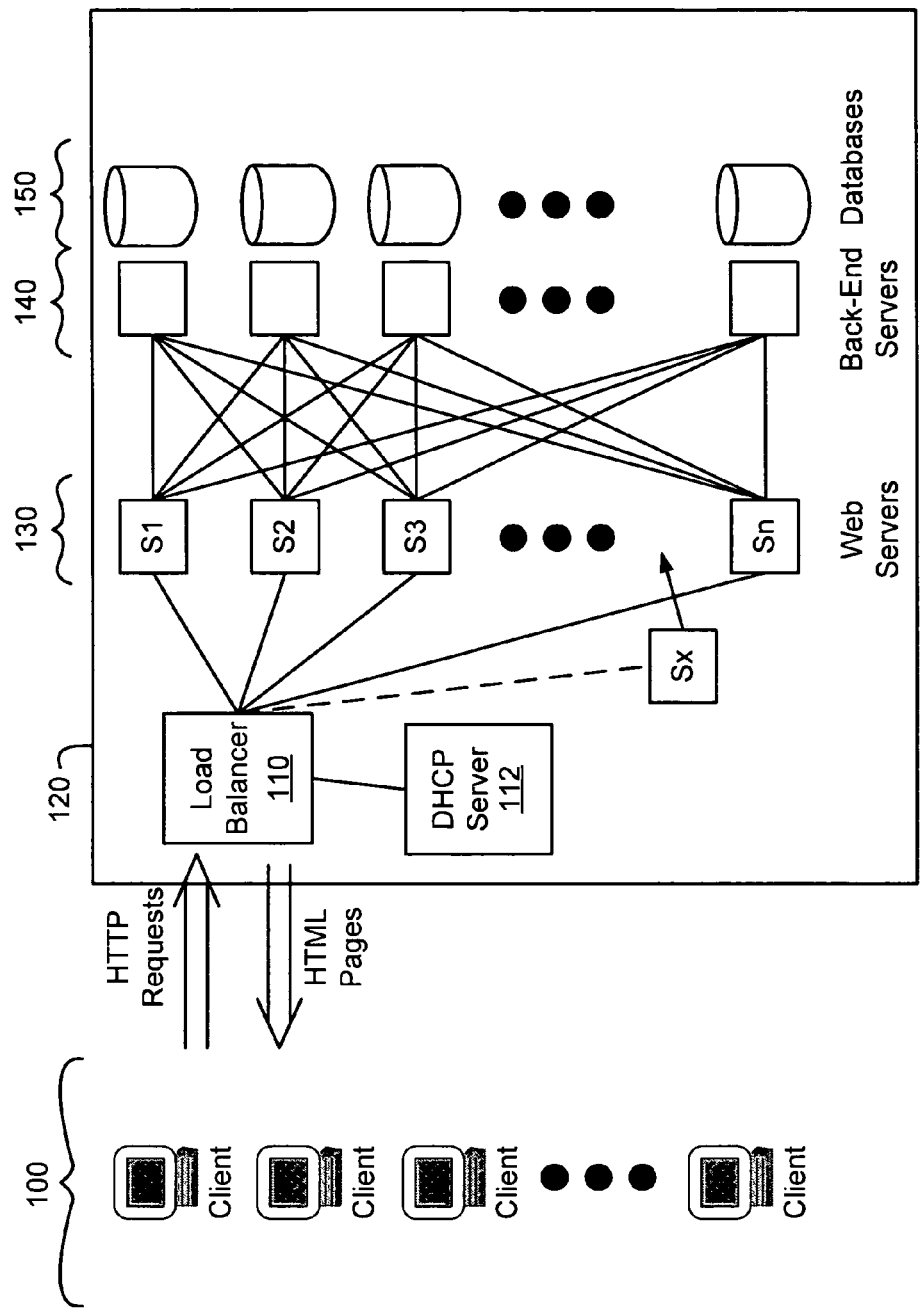
FIG. 1 shows a basic diagram of a server farm according to an embodiment of the invention.

FIG. 1 shows a basic diagram of a server farm according to an embodiment of the invention. Client computers 100 operated by users make Hyper Text Transfer Protocol (HTTP) requests of load balancer 110. Load balancer 110 is a server computer or dedicated device that acts as a front end for server farm 120 that includes various application servers. Load balancer 110's actions include distributing the HTTP requests to web servers 130, and providing web pages in, for example, a Hyper Text Markup Language (HTML) format. Note that although a web server task is used as an example, any type of computing application can be a suitable application. Also, any type, number and arrangement of processing devices can be used in a system in accordance with features of the invention as described herein.

Web servers 130 communicate with back-end servers 140 to access database information from databases 150, perform processing necessary for dynamic web pages, derive content, perform calculations, accomplish financial transactions, and perform other functions. Many other arrangements or designs of a server farm are possible. Any number of devices and layers of devices can be used rather than the specific arrangement shown in FIG. 1. In FIG. 1, there are two types of pools or services for which an added server can be configured. These are web or back-end servers. Other applications can use any number or type of pools or services. Pools and services need not be organized into levels.

New server Sx is shown being added, or brought online. An early step of bringing a server online is for the server to request an Internet Protocol (IP) address from DHCP server 112. In a preferred embodiment, the network is set up so that load balancer 110 is between the application servers and the DHCP server. Since the servers are separated from the DHCP server by the load balancer all of the DHCP requests can be monitored by the load balancer. Thus, the load balancer is in a position to detect DHCP requests and to determine that a new server is being added.

Typically, DHCP is only used for requesting or renewing IP addresses. While it does have more generic capabilities, assigning IP addresses is the only one explicitly covered in RFC 2131 so that other capabilities may not be supported in all implementations of DHCP. In general, there are 5 messages a client can send. These are "discover", "request", "decline", "release", and "inform". In a preferred embodiment the "discover" and "request" messages would be used to detect that the server is coming online.

Other aspects of DHCP can be used to advantage. For example, DHCP allow for additional meta information to be optionally included in a DHCP request in a DHCP "options" field. The meta information may be useful to help the load balancer select a service configuration. Another possibility is to trigger on a response from the DHCP server, rather than just acting on an intercept of a new server's request to the DHCP server. For example, configuration can be initiated by using a DHCP server "offer" message or some other message or network event that is associated with a new server or other device coming online.

Depending upon the implementation and feature set of DHCP (which can vary among implementations, and which can change in the standard in the future) other messages or features may advantageously be used to assist in a detection or request function.

The load balancer can detect an initial DHCP address request by an added server by detecting the DHCP "discover" or "request" message. In most systems, the message is broadcast on the local subnet for receipt by the DHCP server. The DHCP server would then assign an IP address. However, after detection the load balancer can selectively route the message. Using a prioritization scheme the load balancer can route the message to a specific DHCP server to influence what IP address it will receive. The load balancer can also propagate the message, and wait to see what IP address is assigned. The load balancer can then configure itself and the added server accordingly.

A preferred embodiment of the invention is used to configure physical, or "real," servers. These may also be referred to by other names depending on manufacturer-specific devices (e.g., "real" on Cisco Content Switching Module (CSM), or "service" on Cisco Content Services Switch (CSS), etc.).

An added physical device, such as a real server, obtains a dynamic IP address via DHCP. The load balancer, after detecting the configuration, can configure the added device and configure it for use with existing virtual/logical entities. The load balancer dynamically configures a mapping between virtual hosts and physical devices. The load balancer is responsible for advertising virtual hosts (IPs, routes, etc.) to the world and associates some number of physical devices with that virtual host, to process the traffic. In today's systems, virtual hosts are pre-configured and new real servers are associated with virtual hosts as they are added. Other approaches can cause a virtual host to be created or modified with the addition of a new real server.

A real server is typically configured with a single static IP address. Real servers in a same pool or service can have static IPs within a known range or group. The load balancer can treat the group as a single service and communicate with all IPs in a range in order to communicate with and/or configure all servers in a group in that range.

Once a new server is detected, determination about how to configure it can be done by any suitable approach or criteria. For example, one approach is to designate the new server to a pool with a least number of currently active reals. A survey of the existing pools can choose the pool with the least number of active servers. Another approach can be to designate the server to a specific pool based upon the newly-assigned IP address of the real. There may be multiple subnets through the load balancer. The subnet to which the server is added may dictate possible configurations.

Ranges of IP addresses can be determined and compared to the assigned IP address to place the IP address of the new server into a pool corresponding to the range to which the IP address belongs. Another possibility is to consult a list for a next pool designation. The list can be updated by a process that monitors pool activity. The list can also be updated manually by a network administrator or in any other suitable manner. Other approaches can be used such as round robin. Standard load balancing concepts can be used. If IP addresses are recycled then an added server that obtains a recycled (i.e., previously assigned) IP address can be assigned to the same service as the previously assigned server that was using the recycled IP address.

Once the new server is designated for a pool it is configured according to a service or services to perform within that pool. For example, the server can be configured with the same configuration as the highest priority service in the existing pool. Typically, the pool is already associated with a virtual host. The configuration for servicing that virtual host is implicit for any particular pool. Alternative approaches might allow service, pool, or host assignments to be changed more flexibly.

A standard part of a configuration includes information about a health probe mechanisms (such as "keepalives") to be used on the service. These health probe mechanisms can be configured for an added server similarly to existing servers in the added server's pool. Additional configuration particulars include the address, weighting used in load balancing algorithms and other service type parameters. Weightings can be assigned according to any load-balancing scheme. For example, if the load balance algorithm is weighted round robin, then an appropriate weight must be determined and applied. These configuration details can be specific to the server, service, pool or system task.

The DHCP request is not absolutely indicative of a new server being brought online (i.e., added) as the server may just be renewing its IP lease. However, the DHCP request can serve as a trigger for possible server-up events. In other words, not all DHCP events will be servers being added. But all servers being added will generate a DHCP event so this approach can be expected to detect all additions. The DHCP request is normally made by servers when they come online in existing systems so implementation of a detection feature may not require any change in activation steps performed by a server.

Figure 2:
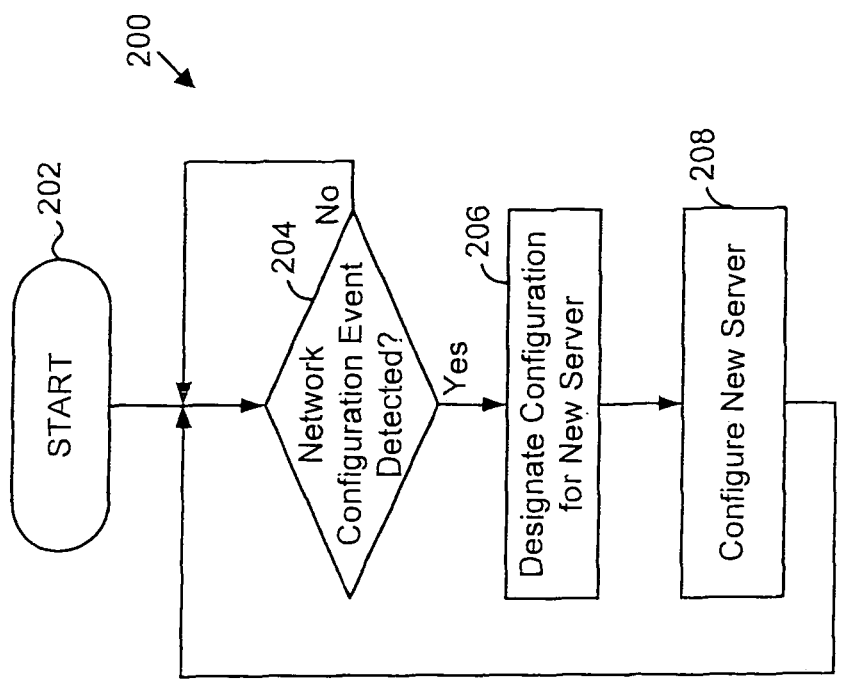
FIG. 2 is a flowchart of a routine to automatically configure a network device.

FIG. 2 shows flowchart 200 to illustrate basic steps of a routine to perform automatic configuration of a network device according to a preferred embodiment of the invention.

In FIG. 2, the routine of flowchart 200 is entered at step 202 as, for example, when a network administrator brings up the network. At step 204, detection of network configuration events is performed. Preferably the detection process runs uninterrupted during the operation of the network so that all configuration events can be detected. Note that any number of instances of the routine, or portions of the routine, can be running on any number of devices (such as load balancers). If more than one instance is running it will naturally be desirable to have coordination and control over the different instances so that, for example, added servers or other devices will not be configured more than once, or incorrectly. In a preferred embodiment, the network configuration events include detection of DHCP "discover" or "request" messages.

When a network configuration event is detected execution proceeds to step 206 where designation of a configuration for an added device is determined. The configuration can be determined by any suitable method including those described above. After a configuration has been designated, step 208 performs automated configuration of the added device, as described herein.

Figure 3:
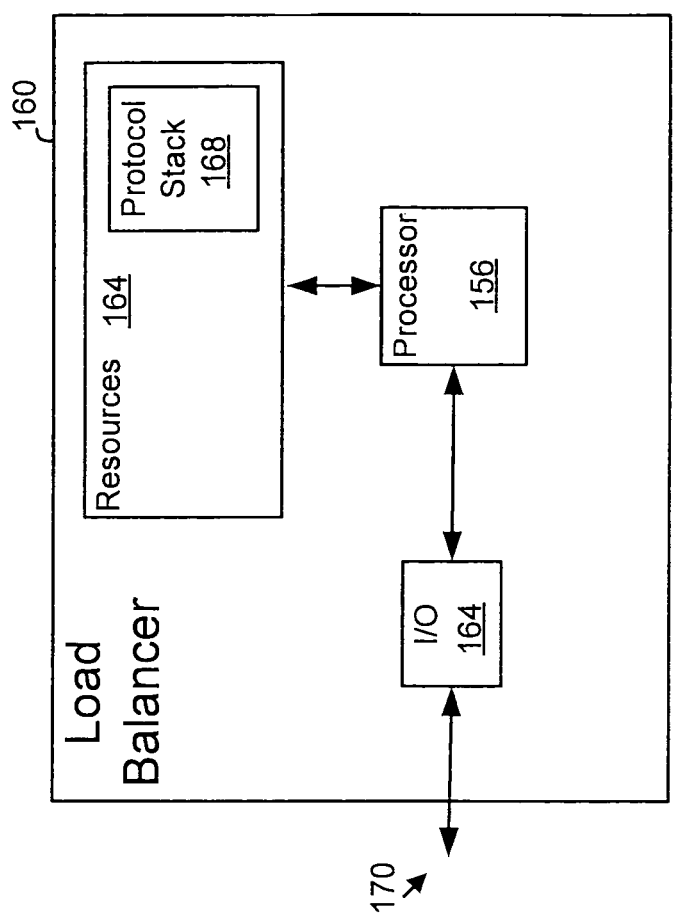
FIG. 3 is a simplified block diagram of a load balancer suitable for use with the present invention.

FIG. 3 shows basic components in a device, such as a load balancer, that is suitable for performing all or a part of the functionality described herein. For ease of presentation, many components of a load balancer have been omitted and one of skill in the art will recognize the block diagram as being very simplified.

Load balancer 160 includes a connection point 170 for coupling to a network. Input/Output (I/O) interface 164 works in conjunction with processor 166 to receive and send data from or to the network. Processor 166 has access to system resources 164 such as random access memory (RAM), persistent storage (disk drives, read-only memory (ROM), etc.), bus devices, user input/output devices, etc. One resource includes a protocol stack 168 for implementing messaging standards such as DHCP. Many other designs are possible to achieve a device or devices capable of performing the functions described herein.

Although embodiments of the invention have been discussed primarily with respect to specific arrangements, formats, protocols, etc. any other suitable design or approach can be used. For example, although certain benefits may be achieved by using DHCP protocol as described herein, other protocols can be used to different advantage. Other embodiments can use other protocols such as Address Resolution Protocol (ARP), RARP, BOOTP, SNMP, RMON, etc. A device (e.g., DHCP server) that performs the network configuration or management tasks including, that of assigning new IP addresses, can use any suitable protocol or communication mechanism.

In general, any network communication or other event can be used to initiate automated configuration if the event is indicative of a server being added to the system (e.g., to a pool, service, or other group, or to perform a specific function). The event can be communicated via any type of communication link, protocol, or mechanism. In cases where other protocols are used, the assignment of an IP address is not a requirement. An IP address can be extracted from other types of communications and validated as belonging to a server as, for example, by detecting the IP subnet to which the extracted IP address belongs. This would allow detection of an added server based on many different types of traffic but would also increase the required processing to do the detection.

Use of DHCP can be advantageous in this respect in that the DHCP messages requesting an IP address are normally only sent when a real server is physically powered on. Typically, renewals for IP addresses are not broadcast, only initial requests, thus resulting in fewer messages to process to detect a new server. However, other embodiments may choose to monitor other types of traffic to discover events. For example, at one extreme all traffic could be monitored for all protocols and a list of every IP address seen on each subnet can be compiled. In such an approach the detection of any new address is guaranteed, but somewhat impractical from a processing standpoint.

The embodiments described herein are merely illustrative, and restrictive of the invention. For example, embodiments of the present invention may include a machine-readable storage medium comprising instructions executable by a computer processor for configuring a new server being added to a group of servers in accordance with various embodiments of the invention. Also, the network may include components such as router, switches, servers and other components that are common in such networks but which have not been discussed for purposes of simplifying the description of features of the invention. Further, these components may comprise software algorithms that implement connectivity functions between the network device and other devices.

Any suitable programming language can be used to implement the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a function.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

A machine-readable medium may be provided with instructions executable by a processor for configuring a new server being added to a group of servers. In an embodiment of the invention, the machine-readable medium comprises one or more instructions for: (a) intercepting a network event sent from the new server to a network configuration device; (b) designating a configuration for the new server; and (c) automatically configuring the new server according to the designated configuration.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for configuring a new server lacking both a server farm network address and a service assignment being added to a group of networked servers in a server farm, the method comprising:
   intercepting, at a load balancer, a network configuration request message sent to a network configuration device, the load balancer being disposed between the network configuration device and the group of networked servers;
   determining that the network configuration request message was sent by the new server lacking both a server farm network address and a service assignment;
   forwarding the network configuration request message to the network configuration device to obtain an IP address for the new server;
   determining a pool of networked servers within the group of networked servers, the determination including:
      receiving the IP address of the new server,
      determining all IP address ranges used by the group of networked servers in the server farm,
      comparing the IP address of the new server with all the IP address ranges, and
      determining a sub-range of IP addresses which the IP address of the new server belongs to, the sub-range corresponding to the pool of networked servers;
   monitoring a health state of constituent services among multiple constituent services operating within the pool of network servers;
   determining, based on monitoring the health state, a highest priority service operating on at least one server within the pool of network servers from among the multiple constituent services operating within the pool of networked servers;
   designating a configuration for the new server which is based on the highest priority service; and
   automatically configuring the new server for the highest priority service and with the IP address of the new server.

2. The method of claim 1, wherein the network configuration device includes a DHCP server.

3. The method of claim 1, wherein the network configuration request message is a DHCP discover message or a DHCP request message.

4. The method of claim 1, wherein the network configuration request message includes one or more of the following protocols: DHCP, ARP, RARP, BOOTP, SNMP, RMON.

5. The method of claim 1, wherein the network configuration device is responsive to one or more of the following protocols: DHCP, ARP, RARP, BOOTP, SNMP, RMON.

6. The method of claim 1, wherein the group of networked servers includes pools of servers, the method further comprising:
   designating the new server to be added to a pool based upon the IP address of the new server.

7. The method of claim 1, wherein the group of servers includes two or more pools of networked servers, and
   wherein automatically configuring the new server for the highest priority service and with the IP address of the new server comprises automatically configuring the new server for the highest priority service, with the IP address of the new server, and with a service parameter including one or more of the following: weight, pool, address, keepalive schedule.

8. The method of claim 1, wherein the group of networked servers includes two or more pools of networked servers, the method further comprising:
 associating a pool with a virtual host; and
 configuring the new server to be included in providing a service in the associated pool.

9. The method of claim 1, wherein forwarding the network configuration request message to the network configuration device includes:
 determining a specific network configuration device from among two or more network configuration devices to which to send the network configuration request message based on a prioritization scheme; and
 forwarding the network configuration request message to the specific network configuration device.

10. An apparatus for configuring a new server lacking both a server farm network address and a service assignment being added to a group of networked servers in a server farm, the apparatus comprising:
 a computer processor;
 a storage device including instructions executable by the processor for:
  intercepting, at a load balancer, a network configuration request message sent to a network configuration device, the load balancer being disposed between the network configuration device and the group of networked servers;
  determining that the network configuration request message was sent by the new server lacking both a server farm network address and a service assignment;
  forwarding the network configuration request message to the network configuration device to obtain an IP address for the new server;
  determining a pool of networked servers within the group of networked servers, the determination including:
   receiving the IP address of the new server,
   determining all IP address ranges used by the group of networked servers in the server farm,
   comparing the IP address of the new server with all the IP address ranges, and
   determining a sub-range of IP addresses which the IP address of the new server belongs to, the sub-range corresponding to the pool of networked servers;
  monitoring a health state of constituent services among multiple constituent services operating within the pool of network servers;
  determining, based on monitoring the health state, a highest priority service operating on at least one server within the pool of network servers from among the multiple constituent services operating within the pool of networked servers;
  designating a configuration for the new server which is based on the highest priority service; and
  automatically configuring the new server for the highest priority service and with the IP address of the new server.

11. The apparatus of claim 10, wherein the network configuration device includes a DHCP server.

12. The apparatus of claim 10, wherein the network configuration request message is a DHCP discover message or a DHCP request message.

13. The apparatus of claim 10, wherein the network configuration request message includes one or more of the following protocols: DHCP, ARP, RARP, BOOTP, SNMP, RMON.

14. The apparatus of claim 10, wherein the network configuration device is responsive to one or more of the following protocols: DHCP, ARP, RARP, BOOTP, SNMP, RMON.

15. The apparatus of claim 10, wherein forwarding the network configuration request message to the network configuration device includes:
 determining a specific network configuration device from among two or more network configuration devices to which to send the network configuration request message based on a prioritization scheme; and
 forwarding the network configuration request message to the specific network configuration device.

16. A storage device including instructions executable by a computer processor for configuring a new server lacking both a server farm network address and a service assignment being added to a group of networked servers in the server farm, the storage device comprising one or more instructions for:
 intercepting, at a load balancer, a network configuration request message sent to a network configuration device, the load balancer being disposed between the network configuration device and the group of networked servers;
 determining that the network configuration request message was sent by the new server lacking both a server farm network address and a service assignment;
 forwarding the network configuration request message to the network configuration device to obtain an IP address for the new server;
 determining a pool of networked servers within the group of networked servers, the determination including:
  receiving the IP address of the new server,
  determining all IP address ranges used by the group of networked servers in the server farm,
  comparing the IP address of the new server with all the IP address ranges, and
  determining a sub-range of IP addresses which the IP address of the new server belongs to, the sub-range corresponding to the pool of networked servers;
 monitoring a health state of constituent services among multiple constituent services operating within the pool of network servers;
 determining, based on monitoring the health state, a highest priority service operating on at least one server within the pool of network servers from among the multiple constituent services operating within the pool of networked servers;
 designating a configuration for the new server which is based on the highest priority service; and
 automatically configuring the new server for the highest priority service and with the IP address of the new server.

17. The storage device of claim 16, wherein the network configuration device includes a DHCP server.

18. The storage device of claim 16, wherein the network configuration request message is a DHCP discover message or a DHCP request message.

19. The storage device of claim 16, wherein the network configuration request message includes one or more of the following protocols: DHCP, ARP, RARP, BOOTP, SNMP, RMON.

20. The storage device of claim 16, wherein the network configuration device is responsive to one or more of the following protocols: DHCP, ARP, RARP, BOOTP, SNMP, RMON.

21. The storage device of claim 16, wherein forwarding the network configuration request message to the network configuration device includes:

determining a specific network configuration device from among two or more network configuration devices to which to send the network configuration request message based on a prioritization scheme; and forwarding the network configuration request message to the specific network configuration device.

22. A method of configuring a new server lacking both a server farm network address and a service assignment being added to a group of networked servers in the server farm, the method comprising the steps of:
- (a) intercepting, at a load balancer, a network configuration request message sent to a network configuration device, the load balancer being disposed between the network configuration device and the group of networked servers;
- (b) determining that the network configuration request message was sent by the new server lacking both a server farm network address and a service assignment;
- (c) forwarding the network configuration request message to the network configuration device to obtain an IP address for the new server;
- (d) determining a pool of networked servers within the group of networked servers, the determination including:
  receiving the IP address of the new server,
  determining all IP address ranges used by the group of networked servers in the server farm,
  comparing the IP address of the new server with all the IP address ranges, and
  determining a sub-range of IP addresses which the IP address of the new server belongs to, the sub-range corresponding to the pool of networked servers;
- (e) monitoring a health state of constituent services among multiple constituent services operating within the pool of network servers;
- (f) determining, based on monitoring the health state, a highest priority service operating on at least one server within the pool of network servers from among the multiple constituent services operating within the pool of networked servers;
- (g) designating a configuration for the new server which is based on the highest priority service; and
- (h) automatically configuring the new server for the highest priority service and with the IP address of the new server.

23. The method of claim 22 additionally comprising performing steps (a) through (h) with the load balancer.

24. The method of claim 22, wherein forwarding the network configuration request message to the network configuration device includes:
determining a specific network configuration device from among two or more network configuration devices to which to send the network configuration request message based on a prioritization scheme; and
forwarding the network configuration request message to the specific network configuration device.

* * * * *

UNITED STATES PATENT AND TRADEMARK OFFICE
CERTIFICATE OF CORRECTION

PATENT NO. : 8,756,298 B2  
APPLICATION NO. : 11/316504  
DATED : June 17, 2014  
INVENTOR(S) : Ma et al.

Page 1 of 1

It is certified that error appears in the above-identified patent and that said Letters Patent is hereby corrected as shown below:

In the Specification

In column 5, line 54, please amend as follows:
and not restrictive of the invention. For example, embodiments of

In column 5, line 60, please replace:
"router" with "routers"

Signed and Sealed this  
Twenty-fifth Day of August, 2015

Michelle K. Lee  
*Director of the United States Patent and Trademark Office*